United States Patent Office 3,405,964
Patented Oct. 15, 1968

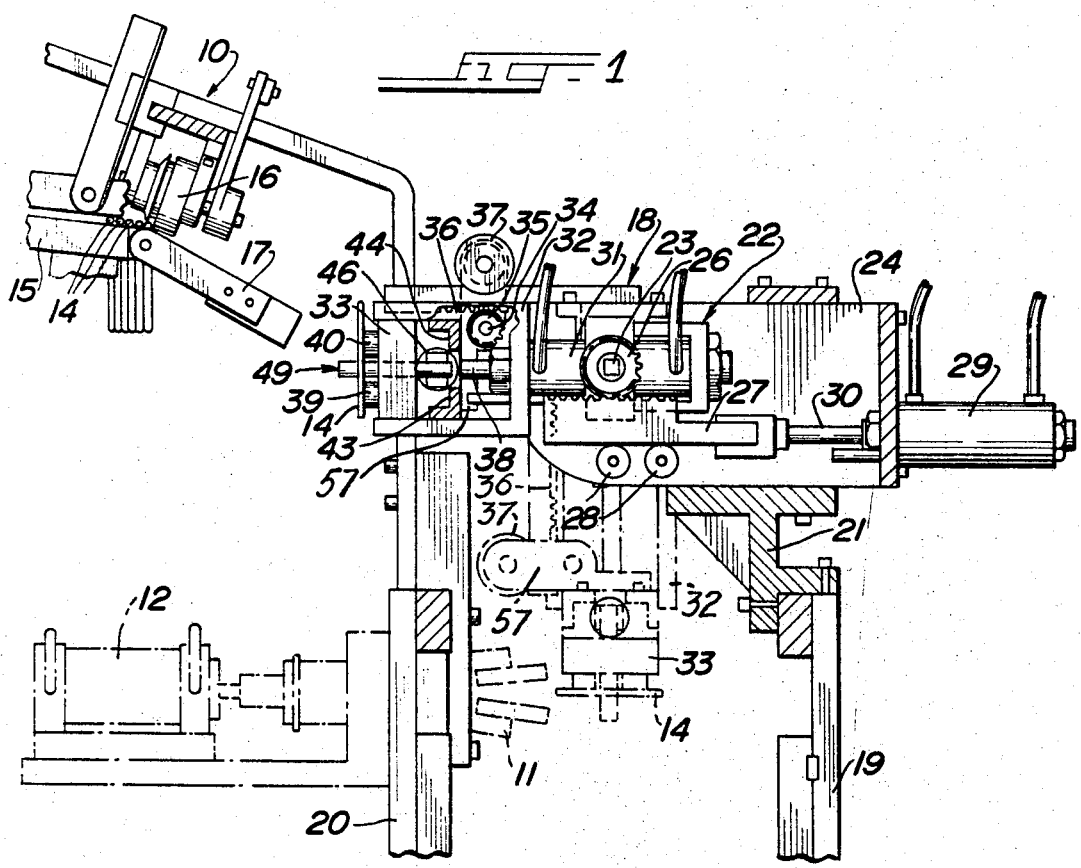

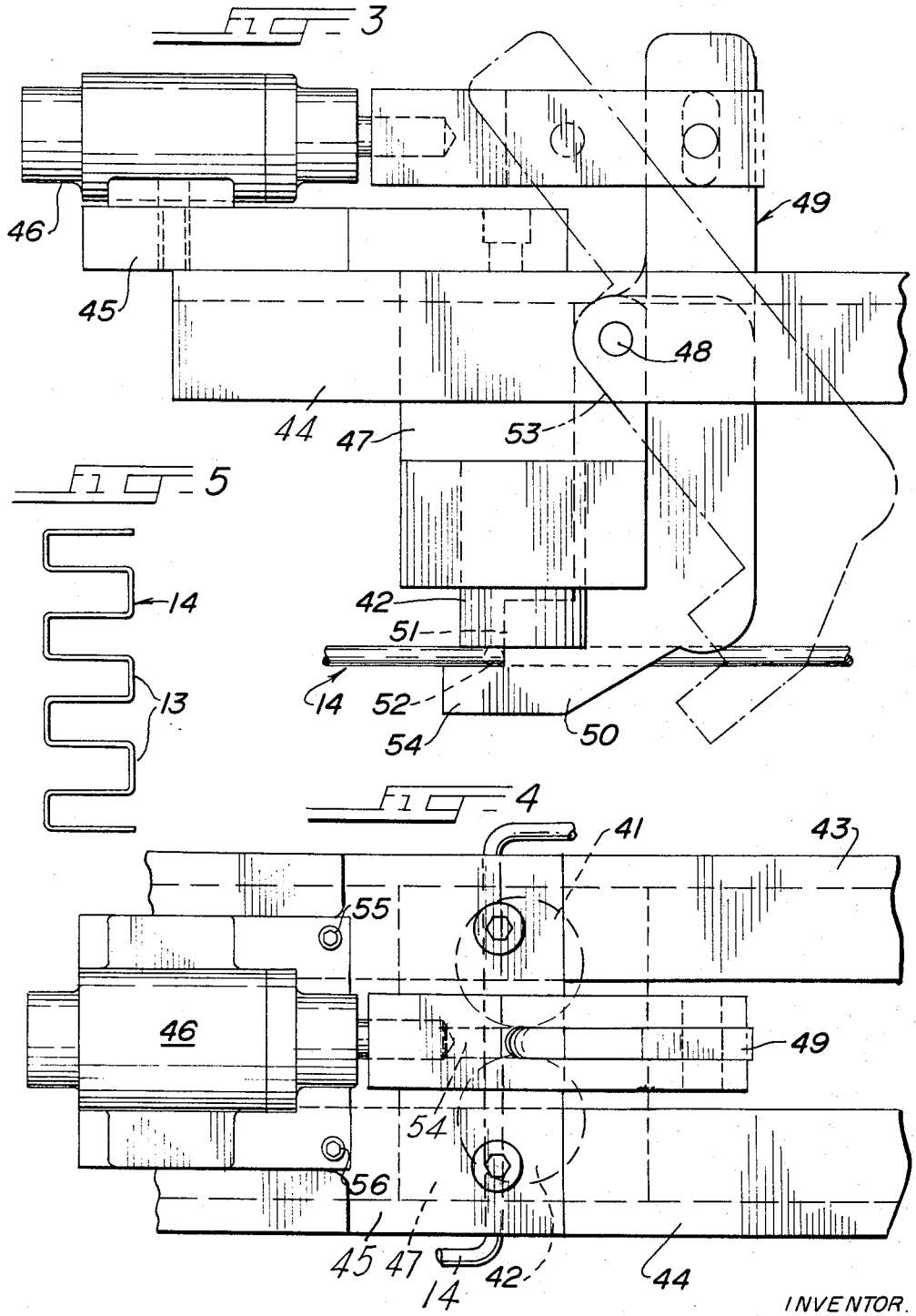

3,405,964
POSITIONING MECHANISM
John Tuit, Grand Rapids, Mich., assignor to McInerney Spring & Wire Company, Grand Rapids, Mich, a corporation of Michigan
Filed Jan. 20, 1966, Ser. No. 537,579
6 Claims. (Cl. 294—65.5)

ABSTRACT OF THE DISCLOSURE

A holding device including magnetic members, and also locating members operative to engage portions of an undulated workpiece to secure and position the same across the face of the magnetic members.

---

This invention relates to the construction of holding devices commonly associated with transfer mechanism. This general type of mechanism is used to transfer a workpiece from one station to another in an automatic machine. The preferred form of this invention has been developed as a part of a machine for removing undulated pieces of steel wire from a supply unit, and placing them in position for engagement with bending devices. The initial holding force that removes the wire from the supply unit is preferably provided by magnets mounted on the frame of the transfer mechanism. The relative position of the transfer mechanism with respect to the supply unit establishes an approximate position of the workpiece with respect to the transfer mechanism. This relative position is rendered more precise by the present invention, with the additional function of deflecting the workpiece into predetermined form to eliminate bending tolerances. The locating function of this invention is combined, in the preferred form, with a latch effect securing the wire to the transfer mechanism to supplement the effect of the magnetic attraction. With some forms of wire workpieces, the locating-latching mechanism can secure the workpieces without the assistance of magnetic means.

The several features of the invention will be analyzed in detail through a discussion of the particular embodiments illustrated in the accompanying drawings. In the drawings:

FIGURE 1 is a sectional elevation of a machine which includes a transfer mechanism and a supply unit, with the preferred form of the invention associated with the transfer mechanism. The full line and dotted line positions in FIGURE 1 illustrate different positions of the transfer mechanism in removing workpieces from the supply unit and placing them in position for engagement with the machine components.

FIGURE 2 is a top view of the device shown in FIGURE 1, with the transfer mechanism in the dotted line position of FIGURE 1.

FIGURE 3 is a fragmentary elevation on an enlarged scale of one of the locating-latching mechanisms.

FIGURE 4 is a top view of the mechanism shown in FIGURE 3.

FIGURE 5 is a view on a small scale showing the form of undulated wire workpiece for which the illustrated form of the invention has been adapted.

Referring to FIGURES 1 and 2, a section of an automatic machine is illustrated which receives the coplanar undulated wire workpieces shown in FIGURE 5 from the supply unit generally indicated at 10, and transfers them into position to be operated upon by bending devices as shown in outline at 11. These devices are essentially jaws that are positioned and driven by air cylinder mechanism as shown at 12, with the jaws being mounted in proper locations to grasp one of the loops 13 of the workpiece generally indicated at 14. These workpieces are shown stored in the rack 15 of the supply unit 10, and a selector mechanism 16 isolates one of them at a time for movement down the inclined ramp structure 17 for engagement with the transfer mechanism generally indicated at 18. The framework of the automatic machine includes the opposite side structure 19 and 20, and the bracket 21 is secured to the frame structure 19 to support the transfer mechanism 18. The transfer mechanism itself will be described only briefly, as it forms no part of the present invention, except as it is associated with the locating and latching device shown in FIGURES 3 and 4. The rotary unit 22 is mounted on the shaft 23, which is supported in the fixed walls 24 and 25 secured to the bracket 21. The shaft itself is rotatably mounted in suitable bearings mounted in the walls 24 and 25, and the shaft is driven by the gear 26 engaged by the rack 27 supported on the rollers 28. The cylinder assembly 29 positions the rack 27 through the rod 30, and movement of the rod 30 will result in rotation of the rotor unit 22 about the axis of the shaft 23.

The rotary unit 22 itself includes the cylinder 31 and the U-shaped frame 32 which is secured to the cylinder 31. The frame 32 provides a guideway for the movable subassembly, 33, which carries the shaft 34 secured to opposite gears 35 engaging the rack 36 on the frame member 32. This structure is repeated at opposite sides of the rotary unit 22, with the components being separately designated as a and b in FIGURE 2. The rollers 37 are mounted on the brackets 57, which also support the shaft 34, with the gears 35 and the rollers 37 being on opposite sides of the rack 36 to maintain proper engagement of the gears 35 and the shaft 34. This engagement assures corresponding movement at opposite sides of the assembly. Actuation of the cylinder 31 will induce movement of the assembly 33 to the left or right (referring to the full line position shown in FIGURE 1) through the action of the piston rod 38, which has the effect of bringing the magnet means 39–40 and 41–42 from a position over to the left (where the workpieces 14 are received from the ramp 17) to the retracted position shown in full lines, preparatory to rotation of the rotary assembly 22 into the dotted line position of FIGURE 1. Subsequent extension of the shaft 38 will lower the workpieces 14 into position for engagement with the bending jaws 11 of the automatic machine.

The movable sub-assembly 33 includes a frame formed by the spaced rails 43 and 44 of standard angular cross-section extending transversely with respect to the frame 32, which forms a guideway for the reciprocating movement of the assembly 33. These rails support the brackets 57 and also the bridging plates 45 which carry the air cylinders 46. Blocks 47 are secured to the plates 45, and extend downwardly between the rails 43 and 44 to also provide support for the magnet units. The block 47 also supports the pivot pin 48 for the locating member 49. Actuation of the cylinder 46 induces movement of the locating member between the full and dotted line positions shown in FIGURE 3. The lower extremity 50 of the member 49 is shaped so that it can be received between the transverse portions of the workpiece 14 which form the loops 13, when the member 49 is in the dotted line position shown in FIGURE 3. Movement of the cylinder to bring the locating member 43 to the full line position causes the surface 51 to engage the transverse portion 52, and pull it across the surface of the magnets 39–42, if it happens to be slightly out of the desired position. The locating member 49 is mounted between the rails 43 and 44, and also between the magnet units. The engagement of the edge 53 of the member 49 with the edge of the block 47 predetermines the final position of the member 49, and consequently that of the transverse portion 52 of the wire workpiece. This same assembly is preferably duplicated at the opposite ends of the rails 43 and 44, with the net effect that the wire workpiece is normally stretched slightly, and is more accurately placed for engagement of the bending devices 11 with the loops 13. The presence of the hook portion 54 will also serve to secure the workpiece 14 to either supplement or replace the effect of the magnet devices. With the blocks 47 secured directly to the plates 45, the entire group of components including the magnet devices, the cylinder 46, and the locating member 49 can be constructed as a removable sub-assembly, and readily attached and detached by securing or removing the screws 55 and 56.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. In combination with an undulated workpiece having spaced transverse portions, a holding device including a frame and magnetic means mounted on said frame and adapted to receive said workpiece, wherein the improvement comprises:

at least one locating member mounted on said frame in an initial position clear of a workpiece held by said magnet means, and movable in the direction substantially normal to said transverse portions to engage one of said transverse portions and displace the same across the surface of said magnet means to a predetermined position, said locating member having a hook portion engageable with a workpiece on the opposite side of said workpiece from said magnet means; and actuating means for operating said locating member.

2. In combination with an undulated workpiece having spaced transverse portions, a holding device including a frame and magnetic means mounted on said frame and adapted to receive said workpiece, wherein the improvement comprises:

at least one locating member pivotally mounted on said frame for rotation on an axis disposed substantially parallel to the normal position of said transverse workpiece portions, the initial position of said member being clear of the workpiece held by said magnet means, said member being movable in the direction substantially normal to said transverse portions to engage one of said transverse portions and displace the same across the surface of said magnet means to a predetermined position; and actuating means for operating said locating member.

3. In combination with an undulated workpiece having spaced transverse portions, a holding device including a frame and magnetic means mounted on said frame and adapted to receive said workpiece, wherein the improvement comprises:

at least one locating member mounted on said frame in an initial position clear of a workpiece held by said magnet means and disposed between undulations in said workpiece as said workpiece is engaged by said holding device, said member being movable in the direction substantially normal to said transverse portions to engage one of said transverse portions and displace the same across the surface of said magnet means to a predetermined position; and actuating means for operating said locating member.

4. In a combination with an undulated workpiece having spaced transverse portions, a holding device including a frame having spaced parallel rails, and magnetic means mounted on said frame and adapted to receive said workpiece, wherein the improvement comprises:

at least one locating member pivotally mounted with respect to said rails on an axis transverse with respect thereto, said member extending between the said rails and having an initial position clear of a workpiece held by said magnet means, and movable in the direction substantially normal to said transverse portions to engage one of said transverse portions and displace the same across the surface of said magnet means to a predetermined position; and actuating means for operating said locating member.

5. In combination with a magnetic holding device adapted to engage in an approximate relative position an undulated workpiece having spaced transverse portions, said device including a frame and magnet means mounted on said frame, a positioning mechanism comprising:

a pair of opposite locating members mounted on said frame in an initial position clear of said workpiece in the normal position thereof on said magnet means, and movable in opposite directions substantially normal to said transverse portions to engage spaced transverse portions to displace the same across the surface of said magnet means to a predetermined position, and generate tension in said workpiece; and actuating means for operating said locating member.

6. In combination with a magnet holding device adapted to engage in an approximate relative position an undulated workpiece having spaced transverse portions, said device including a frame having spaced parallel rails, and also having magnet means mounted on said frame, a positioning mechanism comprising:

at least one locating member extending between said rails, and pivotally mounted, with respect to said rails on an axis transverse with respect thereto from an initial position clear of a workpiece held by said magnet means, and movable in a direction substantially normal to said transverse portions to engage one of said transverse portions and displace the same across the surface of said magnet means to a predetermined position; and actuating means for operating said locating member, said actuating means including a piston-cylinder device mounted on the opposite side of said rails from said magnet means.

References Cited

UNITED STATES PATENTS

| 2,862,601 | 12/1958 | Littwin et al. | 198—41 XR |
| 916,374 | 3/1909 | Schnabel | 214—114 |
| 1,050,578 | 1/1913 | Tucker | 294—97 X |
| 2,783,078 | 2/1957 | Billner | 214—114 X |
| 2,862,756 | 12/1958 | Larson | 294—88 |
| 2,951,725 | 9/1960 | St. Jean | 294—97 |

FOREIGN PATENTS

| 99,080 | 1/1925 | Austria. |

ROBERT G. SHERIDAN, *Primary Examiner.*

F. E. WERNER, *Assistant Examiner.*